(12) United States Patent
Ma

(10) Patent No.: US 6,493,317 B1
(45) Date of Patent: Dec. 10, 2002

(54) TRAFFIC ENGINEERING TECHNIQUE FOR ROUTING INTER-CLASS TRAFFIC IN A COMPUTER NETWORK

(75) Inventor: Qingming Ma, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/215,904

(22) Filed: Dec. 18, 1998

(51) Int. Cl.$^7$ .............................................. H04L 12/26
(52) U.S. Cl. .................................. 370/237; 370/395.52
(58) Field of Search ........................... 370/395.52, 230, 370/232–235, 252, 391, 437, 444, 254, 255, 351, 389, 392, 400, 401, 238, 237, 238.1; 709/238, 240, 241

(56) References Cited

U.S. PATENT DOCUMENTS

| | | | | |
|---|---|---|---|---|
| 5,233,604 A | * | 8/1993 | Ahmadi et al. | 370/255 |
| 5,289,462 A | * | 2/1994 | Ahmadi et al. | 370/255 |
| 5,434,848 A | * | 7/1995 | Chimento, Jr. et al. | 370/232 |
| 5,491,690 A | * | 2/1996 | Alfonsi et al. | 370/255 |
| 5,535,195 A | * | 7/1996 | Lee | 370/254 |
| 5,687,167 A | * | 11/1997 | Bertin et al. | 370/254 |
| 5,815,492 A | * | 9/1998 | Berthaud et al. | 370/234 |
| 5,940,372 A | * | 8/1999 | Bertin et al. | 370/238 |
| 5,949,760 A | * | 9/1999 | Stevens et al. | 370/254 |
| 5,970,050 A | * | 10/1999 | Johnson | 370/238 |
| 6,044,075 A | * | 7/2000 | Le Boudec et al. | 370/351 |
| 6,084,858 A | * | 7/2000 | Mathews et al. | 370/238 |

OTHER PUBLICATIONS

Q. Ma and P. Steenkiste. On Path Selection for Traffic with Bandwidth Guarantees. In *IEEE International Conference on Network Protocols*, Atlanta, Georgia, Oct. 1997.

Q. Ma, P. Steenkiste, and H. Zhang. Routing High–Bandwidth Traffic in Max–Min Fair Share Networks. In *ACM SIGCOMM '96*, pp. 206–217, Stanford, CA, Aug. 1996.

Q. Ma and P. Steenkiste. Quality–of–Service Routing for Traffic with Performance Guarantees. In *IFIP Fifth International Workshop on Quality of Service*, pp. 115–126, NY, NY, May 1997.

* cited by examiner

*Primary Examiner*—Steven Nguyen
*Assistant Examiner*—Phuongchau Ba Nguyen
(74) *Attorney, Agent, or Firm*—Beyer, Weaver & Thomas, LLP.

(57) ABSTRACT

A technique is provided for routing traffic in an integrated services network which supports a plurality of different service classes including a relative low priority class (e.g. best-effort) and a relative high priority class (e.g. guaranteed sessions). The technique of the present invention improves inter-class resource sharing efficiency and achieves high network throughput of each class of service in the network. The technique discourages guaranteed (high priority) traffic from using links that are already loaded with best-effort (low priority) traffic. This is achieved by using, in the link cost for high priority traffic, a concept of "virtual residual bandwidth", derived from the link residual bandwidth by taking into account of the congestion condition of low priority traffic. The proposed mechanism is simple in the sense that no changes are needed to the path selection algorithms employed for individual service classes the only change is in the link cost. The distribution of network resources across traffic classes adapts dynamically and automatically to the mix of traffic in the traffic classes, even if the traffic distribution is uneven across the network. When the traffic load is concentrated, significant performance improvements are achieved for low priority sessions without penalizing high priority sessions.

32 Claims, 7 Drawing Sheets

TRAFFIC ENGINEERING TECHNIQUE FOR ROUTING INTER-CLASS TRAFFIC IN A COMPUTER NETWORK

BACKGROUND OF THE INVENTION

The present invention relates to computer networking technology, and in particular to traffic engineering techniques in a multi-service class routing network.

Future Internet will support multiple classes of service in addition to best-effort service. A variety of service models have been proposed to deliver different levels of end-to-end Quality-of-Service (QoS) to applications. These services require network support of packet scheduling, signaling protocols (e.g., RSVP) and admissions policies. As diverse as these models are, there is a common theme: the network gives preferential treatment to flows in one class over flows in other classes, and bandwidth is the key QoS parameter.

A representative prototypical example of an integrated services network supports at least two different traffic classes: bandwidth-guaranteed and best-effort traffic. Bandwidth-guaranteed traffic may include both guaranteed service traffic and differentiated service traffic (differentiated service traffic may include assured forwarding and/or expedited forwarding). The network resources are shared by these two service classes. As a result of the different resource sharing models (allocation/reservation for guaranteed sessions and fair sharing for best-effort sessions), guaranteed sessions have priority over best-effort sessions. Once resources are allocated for guaranteed sessions, they are no longer available for best-effort sessions, unless the allocated resources are unused by guaranteed sessions. The packet scheduler in a router or switch ensures that the guaranteed traffic will receive, at a minimum, its allocated share of bandwidth. The portion of the link capacity available to best-effort traffic is typically allocated according to max-min fair sharing policy. Given a fixed traffic load of guaranteed sessions, the resources available to best effort traffic will be influenced by the routing for guaranteed sessions. In such a prototypical multi-class network, if the routing algorithm for guaranteed sessions ignores the load of, or even the presence of, lower priority traffic, as is commonly done, the result is that the throughput of guaranteed traffic is optimized while the performance of best-effort sessions is ignored.

With the integration of voice, video, and data traffic, the aggregate bandwidth requirement of applications is getting higher. More network infrastructures are being built with high-end routers/switches having a large number of interfaces. As a result, the network connectivity is dramatically increasing. Although ISPs do their best to configure their network topologies to match expected traffic load, the traffic load changes dynamically and the routers/switches can go down from time to time. Therefore, the network traffic load often mismatches the underlying network topology, resulting in some links being very congested while other links sit idle. Traffic engineering is an important network service that enables ISPs to balance the traffic load and improve the overall bandwidth efficiency. The importance of traffic engineering has long been recognized in the telecommunication industry and is receiving increased attention in the data networking industry, largely due to growing traffic loads and network sizes.

The main goal of traffic engineering is to achieve network resource efficiency by directing certain traffic flows to travel through some explicit routes other than the default paths determined by routing protocols, such as, for example, OSPF, EIGRP, and BGP. Conventionally, the key to achieving this goal is to select paths for selected traffic flows which meet the following two criteria:

(1) Conserve resources the selected path should consume as few resources as possible, especially when the network load is heavy; and (2) Balance load the selected path should preferably not be congested, especially when the network load is concentrated.

These two criteria often conflict with each other: A path that consumes fewest network resources may be very congested. On the other hand, a path that is less congested may be many hops longer than the minimum-hop path to a particular node. Striking a balance between these two criteria when selecting a path has been the focus of recent studies in traffic engineering. Different service classes may deploy different resource sharing policies among their traffic flows. As a result, different traffic engineering algorithms may be used for different service classes.

While traffic engineering for individual traffic classes has been addressed in both telecommunication industry and data networking industry, traffic engineering that improves inter-class resource sharing for a network that supports multiple classes of service has received little attention. Current techniques statically partition link resources between different service classes and perform traffic engineering for each traffic class based on the resource availability for that traffic class. This approach is problematic since it is difficult if not impossible to make such a partition without either rejecting connections for guaranteed traffic (resulting in low network throughput) or causing congestion or starvation of best-effort traffic. Moreover, the traffic loads of the different traffic classes are not always evenly distributed over the network. For example, guaranteed sessions can be concentrated in one part of the network, while best-effort sessions can be concentrated in another part of the network. Static partitioning cannot adapt to such an imbalance.

Another common approach is to use the measured link utilization of both guaranteed traffic as well as best-effort traffic as the link state for the both traffic classes. This means that the traffic engineering algorithm for guaranteed traffic takes full consideration of the load conditions of best effort traffic, and routes guaranteed sessions along the links with low utilization. However, link utilization is not always a good indicator of how much bandwidth is available to reserve. For example, very bursty best-effort sessions can consume all link bandwidth, which leads to high utilization of the link, even though the link in question has reservable bandwidth. Thus, the traffic engineering algorithm for guaranteed traffic may reject a request even though reservable bandwidth is available.

Traffic engineering techniques in a multi-service class network may differ greatly from traffic engineering techniques in a single-service class network. Not only is there a need to take care of resource utilization efficiency within respective service classes, but there is also a need to avoid congestion or starvation of traffic flows having lower priority. For example, in a network that supports both bandwidth-guaranteed traffic and best-effort traffic, resources available to best-effort traffic rely on how guaranteed flows are routed. Guaranteed flows can reserve all bandwidth on certain links, thus result in congestion for, or even starvation of, best effort sessions. Additionally, statically partitioning the link resources can also result in low network throughput because of dynamic traffic mix. Thus, routing in a multi-class network is more than simply selecting for each flow an "optimal" path according to the routing algorithms developed for the traffic class of this flow, since such an "optimal" path can worsen the congestion condition of other flows belonging to different traffic classes.

It is therefore desirable to provide a multi-class traffic engineering technique which improves inter-class resource sharing efficiency and achieves high network throughput of each class of service in the network. It is also desirable to provide a multi-class traffic engineering technique that dynamically distributes link resources across different traffic classes based on load conditions of each traffic class. It is further desirable to provide a multi-class traffic engineering technique which is simple in design, and does not require modifications to existing routing algorithms employed for individual service classes within the network.

SUMMARY OF THE INVENTION

According to specific embodiments of the invention, a technique is provided for routing traffic in an integrated services network which supports a plurality of different service classes including a relative low priority class and a relative high priority class. The technique of the present invention improves inter-class resource sharing efficiency and achieves high network throughput of each class of service in the network. Additionally, the technique of the present invention dynamically distributes link resources across different traffic classes based on load conditions of each traffic class. Moreover, the technique of the present invention may be done without modifications to existing routing algorithms employed for individual service classes within the network.

According to a specific embodiment of the present invention, a method is provided for routing traffic in an integrated services network which supports a plurality of different service classes. The method includes the steps of selecting a particular service class of traffic for routing analysis; calculating link congestion of at least a portion of the network, wherein a respective residual bandwidth value and a respective link congestion index is calculated for each link within the network portion; and dynamically adjusting the calculated residual bandwidth value for each respective link within the network portion. If a selected link shows a relatively high congestion level of lower priority traffic, the residual bandwidth value for the selected link is decreased; and if a selected link shows a relatively low congestion level of lower priority traffic, the residual bandwidth value for the selected link is increased. After the residual bandwidth value for each respective link in the network portion has been dynamically adjusted according to the measured congestion of lower priority traffic on each respective link, an optimal path for routing traffic associated with the selected class of service is determined using the dynamically adjusted residual bandwidth values.

A second specific embodiment of the present invention provides a method for routing traffic associated with a selected class of service in an integrated services network which supports a plurality of different service classes. The method includes the steps of calculating, based upon a selected class of service, a virtual residual bandwidth value for each link within at least a portion of the network; and utilizing the virtual residual bandwidth values to determine an optimal path for routing traffic associated with the selected class of service. The virtual residual bandwidth values for each respective link within the network portion are calculated by adjusting the values of the respective residual bandwidth values for each link to discourage the use of links having relatively high congestion levels of lower priority traffic, and to encourage the use of links having relatively low congestion levels of lower priority traffic. To discourage the use of a particular link, a negative credit bandwidth value is added to the respective residual bandwidth value for that link, thereby yielding a virtual residual bandwidth value which is less than the actual bandwidth value for that particular link. In contrast, to encourage the use of a particular link, a positive credit bandwidth value is added to the respective residual bandwidth value for a particular link, thereby yielding a virtual residual bandwidth value that is greater than the actual residual bandwidth value for that particular link.

A third specific embodiment of the present invention provides a computer program product for use in an integrated services network which supports a plurality of different service classes. The computer program product comprises a computer usable medium having computer readable code embodied thereon for implementing a technique for routing traffic associated with a selected class of service. The computer readable code includes computer code for calculating, based on a selected class of service, a virtual residual bandwidth value for each link within at least a portion of the network; computer code for utilizing the virtual residual bandwidth values to determine an optimal path for routing traffic associated with the selected class of service; and a computer readable medium that stores the computer code. Also included within the computer program product is computer code for calculating a respective residual bandwidth value and a respective link congestion index for each link within the network portion; and computer code for utilizing the calculated residual bandwidth value and congestion index for a selected link to determine the virtual residual bandwidth value for that selected link. Additionally, the computer program product includes computer code for calculating a credit bandwidth value for each respective link in the network portion. If the congestion index for a selected link indicates a relatively high level of congestion of lower priority traffic, the credit bandwidth for a selected link is assigned a value less than zero. If, however, the congestion index for a selected link indicates a relatively low congestion level of lower priority traffic, the credit bandwidth for the selected link is assigned a value greater than zero. The computer program product further includes computer code for summing or adding the residual bandwidth value and credit bandwidth value of a selected link to determine the virtual residual bandwidth value of that link.

A fourth specific embodiment of the present invention provides an apparatus for routing traffic in an integrated services network which supports a plurality of different service classes. The apparatus includes means for selecting a particular service class of traffic for routing analysis; means for calculating link congestion of at least a portion of the network, wherein a respective residual bandwidth value and a respective link congestion index is calculated for each link within the network portion; and means for dynamically adjusting the calculated residual bandwidth value for each respective link within the network portion. If the congestion index for a selected link indicates a relatively high congestion level of lower priority traffic, the residual bandwidth value for the selected link is decreased; and if the congestion index for a selected link indicates a relatively low congestion level of lower priority traffic, the residual bandwidth value for the selected link is increased. The apparatus additionally includes means for determining an optimal path for routing traffic associated with the selected class of service using the dynamically adjusted residual bandwidth values.

The technique of the present invention provides guaranteed traffic engineering algorithms with the ability to service best-effort traffic without reducing the network throughput for guaranteed traffic. The technique uses a concept of "virtual residual bandwidth", wherein the residual bandwidth value for a link is adjusted higher or lower depending on the level congestion condition of best-effort traffic on that link. The technique discourages guaranteed traffic from using links that are already heavily loaded with best-effort traffic, and encourages links lightly loaded with best-effort traffic. Moreover, this technique may be implemented without changes to the traffic engineering algorithms deployed for individual service classes. Rather, changes are made in the link cost functions used in the traffic engineering algorithms.

Using the technique of the present invention, the distribution of network resources across traffic classes adapts dynamically and automatically to the mix of traffic in the traffic classes, even if the traffic distribution is uneven across the network. Thus, link resources are dynamically partitioned between guaranteed traffic and best-effort traffic. When the traffic load is concentrated, significant performance improvements are achieved for low priority sessions without penalizing high priority sessions.

Additional features and advantages of the present invention will become apparent from the following description of its preferred embodiments, which description should be taken in conjunction with the accompanying drawings.

DETAILED DESCRIPTION OF THE PREFERRED EMBODIMENT

Figure 1:
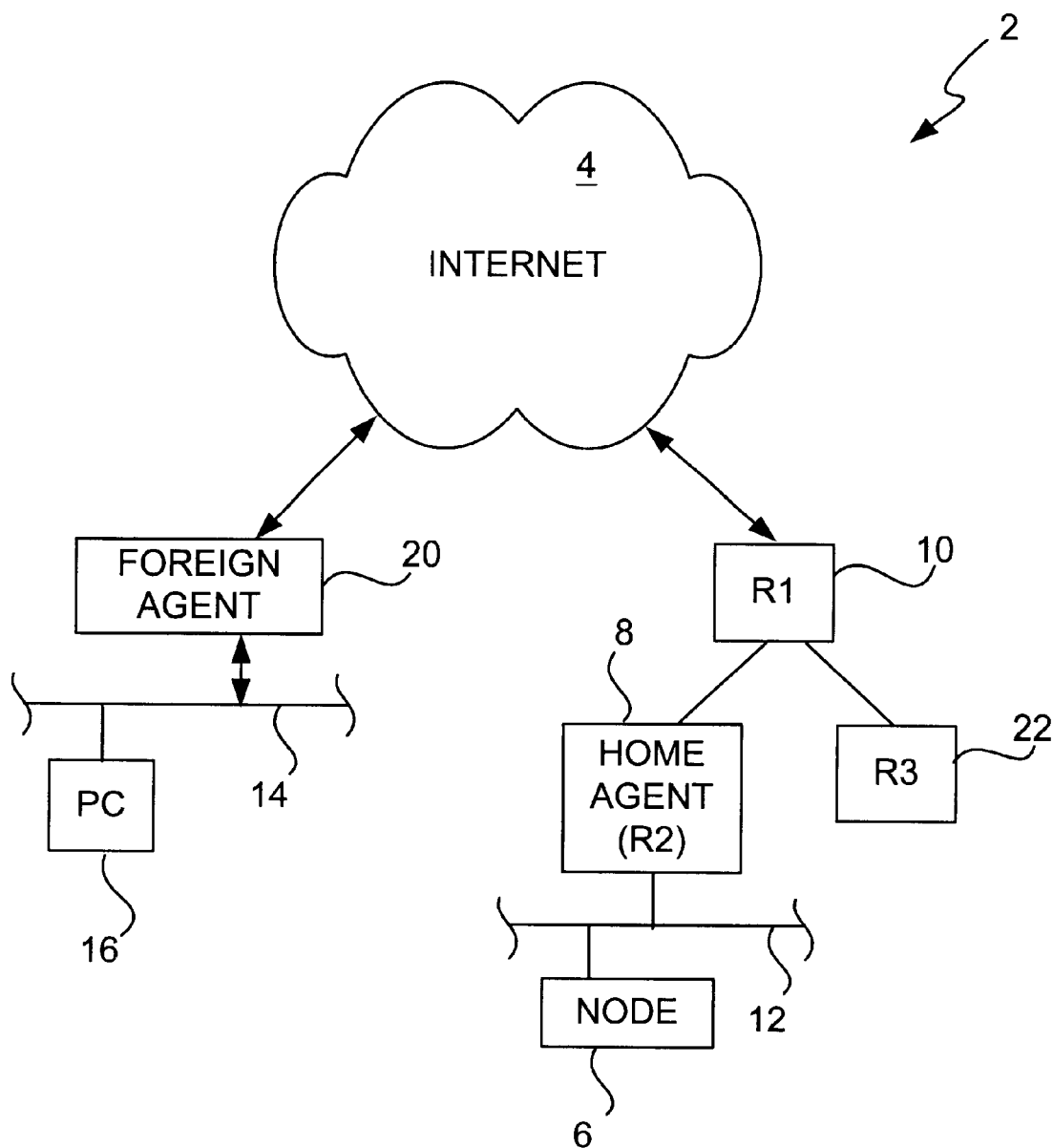
FIG. 1 shows a diagram of an IP network, which is an example of one type of linked network in which the technique of the present invention may be implemented.

FIG. 1 shows a diagram of an IP network, which is an example of one type of flow-based network in which the technique of the present invention may be implemented. A flow can be a hard-state virtual circuit in an ATM network, a soft-state flow in an IP network (e.g., a MPLS tunnel), or a stateless connection as a TCP connection in today's Internet.

As shown in FIG. 1, the IP network 2 includes the internet (or a WAN) 4 over which a Node 6 can communicate remotely via mediation by a Home Agent 8 and a Foreign Agent 20. Typically, the Home Agent and Foreign Agent are routers or other network connection devices performing appropriate IP functions as implemented by software, hardware, and/or firmware. A particular Node (e.g., a laptop computer) plugged into its home network segment connects with the internet through its designated Home Agent. Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 (10) may, in turn, connect one or more other routers (e.g., a router R3) with the internet.

Figure 2:
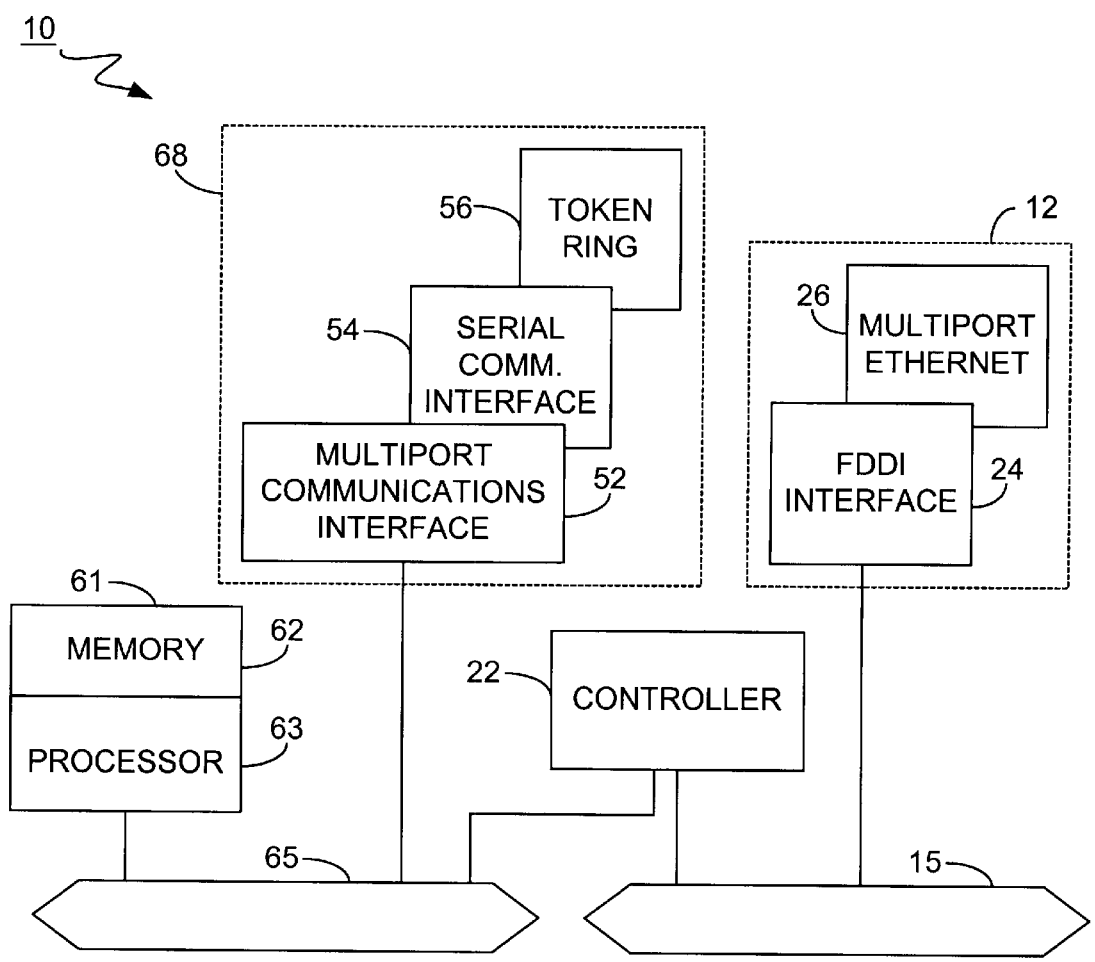
FIG. 2 is a block diagram of a router that may be used in this invention.

Referring now to FIG. 2, a router 10 is shown, which, for example, may be configured to function as router R1 in FIG. 1. The router 10 of FIG. 2 includes a master central processing unit (CPU) 62, low and medium speed interfaces 68, and high speed interfaces 12. In specific embodiments, the CPU 62 is responsible for such router tasks as routing table computations and network management. It may include one or more microprocessor chips selected from complex instruction set computer (CISC) chips (such as the Motorola 68040 microprocessor), reduced instruction set computer (RISC) chips, or other available chips. In a specific embodiment, non-volatile RAM and/or ROM also form part of CPU 62. However, there are many different ways in which memory could be coupled to the system.

The interfaces 62 and 68 are typically provided as interface cards. Generally, they control the sending and receipt of data packets over the network and sometimes support other peripherals used with the router 10. The low and medium speed interfaces 68 include a multiport communications interface 52, a serial communications interfaces 54, and a token ring interface 56. The high speed interfaces 12 include an FDDI interface 24 and a multiport ethernet interface 26. Preferably, each of these interfaces (low/medium and high speed) includes (1) a plurality of ports appropriate for communication with the appropriate media, and (2) an independent processor such as, for example, the 2901 bit slice processor (available from Advanced Micro Devices corporation of Santa Clara Calif.), and in some instances (3) volatile RAM. The independent processors control such communications intensive tasks as packet switching and filtering, and media control and management. By providing separate processors for the communications intensive tasks, this architecture permits the master microprocessor 62 to efficiently perform routing computations, network diagnostics, security functions, etc.

The low and medium speed interfaces are coupled to the master CPU 62 through a data, control, and address bus 65. High speed interfaces 12 are connected to the bus 65 through a fast data, control, and address bus 15 which is in turn connected to a bus controller 22. The bus controller functions are provided by a processor such a 2901 bit slice processor.

The embodiment shown in FIG. 2 is an example of a one type of router configuration which can be used in conjunction with the present invention. It is by no means the only router architecture on which the present invention can be implemented. For example, an architecture having a single processor that handles communications as well as routing computations, etc. would also be acceptable. Further, other types of interfaces and media could also be used with the router.

As stated previously, traffic engineering techniques that improve inter-class resource sharing for a network which supports multiple classes of service have received little attention. Conventional theories suggest that QoS routing is effective only when the load of guaranteed traffic exceeds what the network can accommodate. When the load of guaranteed traffic is light, call blocking is not an issue. In such a case, choosing different routing algorithms for guaranteed traffic may have little impact on overall network throughput. In an integrated services network where best-effort traffic continues to be dominant, a guaranteed flow may rarely be blocked. Therefore, QoS routing may have little role to play to improve the network throughput.

Counter to this common belief, however, extensive simulation results have shown that using the short-widest path algorithm for guaranteed traffic can lower the throughput of best effort traffic significantly compared with other algorithms, even though call blocking is not an issue. These results indicate that choosing different routing algorithms for guaranteed traffic does have an impact on the overall network throughput. Moreover, Quality-of-Service (QoS) routing for guaranteed traffic may have a significant impact on overall network throughput even when the load for guaranteed traffic is light and call blocking is not an issue.

There are several possible ways to route traffic in a multi-class network. The simplest approach is to combine the algorithms for individual traffic classes. As discussed above, this approach does not address the issue of resource distribution across service classes, and as a result, it may cause significant congestion or even starvation of best-effort traffic.

A second approach is to enforce a static link sharing policy. With this approach, the capacity of a link is statically divided between guaranteed sessions and best-effort sessions. This approach also has a number of problems. First, because the ratio of guaranteed sessions over best-effort sessions changes over time, it is difficult to determine how much of the link capacity should be used for each traffic class without sacrificing resource utilization efficiency. Allocating too much bandwidth for best effort sessions can introduce high blocking rate for guaranteed sessions, while allocating too little bandwidth for best effort sessions can cause serious congestion. Second, the traffic loads of the different traffic classes are not always evenly distributed over the network. For example, guaranteed sessions can be concentrated in one part of the network, while best-effort sessions can be concentrated in another part of the network. Static sharing policies cannot adapt to such an imbalance, so they can result in both poor resource utilization and congestion.

A semi-dynamic link sharing policy may be employed to overcome the problems of static link sharing. Under this sharing policy, the distribution of the measured link utilization for different traffic classes is periodically measured, and used to determine what fraction of the link capacity should be assigned to the different traffic classes. While this provides some degree of adaptation, this strategy may not work well if there are sudden changes in the utilization. Often these changes are caused by external phenomena which are difficult or impossible to predict and whose effects are acute. Because the semi-dynamic algorithms are reactive rather than pro-active, latencies associated with their adaptive operation may make their reaction times too long.

Another approach is to use the measured link utilization of both guaranteed traffic as well as best-effort traffic as the link state for the both traffic classes. This means that the routing algorithm for guaranteed traffic considers the load conditions of best effort traffic, and is likely to route guaranteed sessions along the links with low utilization. However, link utilization is not always a good indicator of how much bandwidth is available to reserve. For example, very bursty best-effort sessions can consume all link bandwidth, which leads to high utilization of the link, even though the link in question has reservable bandwidth. The routing algorithm for guaranteed traffic may reject a request even though reservable bandwidth is available.

Another extreme is to simply ignore the load of guaranteed traffic and use the load of best-effort traffic alone to select paths for guaranteed sessions. However, this can lead to a high blocking rates in some scenarios, since it does not take the load of guaranteed traffic into consideration.

A preferred multi-class routing technique allows link resources to be dynamically partitioned between guaranteed traffic and best-effort traffic. This inventive technique discourages guaranteed traffic from using links that are already heavily loaded with best-effort traffic, and encourages links lightly loaded with best-effort traffic. Moreover, this technique does not require any changes to the traffic engineering algorithms deployed for individual service classes. Rather, changes are made in the link cost functions used in the traffic engineering algorithms.

The technique uses a flow-based network model. A flow can be a hard-state virtual circuit in an ATM network, a soft-state flow in an IP network (e.g., a MPLS tunnel), or a stateless connection as a TCP connection in today's Internet. It is assumed that best effort sessions share resources according to max-min fairness. This sharing policy is not only representative of the ATM ABR service, but under some conditions it also approximates IP networks. However, it is to be understood that other techniques commonly known to one skilled in the art for resource sharing may be employed. For example, a discussion of resource sharing techniques is presented in the reference document, "Bottleneck Flow Control," IEEE Transactions on Communications, J. M. Jaffe, COM-29(7), July 1981, herein encorporated by reference in its entirety for all purposes.

Since best-effort traffic will continue to be the dominant traffic class in integrated services networks, it is believed important to focus on improving the resource utilization efficiency when best effort traffic is the dominant traffic class. In this regard, the present invention has been designed to address the following goals:

(1) It is desirable to admit the same number of guaranteed sessions as would be admitted by a network dedicated to guaranteed traffic; and (2) It is desirable to improve the performance of the best-effort traffic by optimizing the placement of the guaranteed sessions.

The present invention provides a multi-class QoS routing technique that supports efficient inter-class resource sharing. The technique discourages guaranteed (high priority) traffic from using links that are already loaded with best effort (low priority) traffic. This is achieved by using, in the link cost for high priority traffic a "virtual residual bandwidth", derived from the link residual bandwidth by taking into account of the congestion condition of low priority traffic. The proposed mechanism is simple in the sense that it may be implemented without changes to the path selection algorithms employed for individual service classes the only change is in the link cost. The distribution of network resources across traffic classes adapts dynamically and automatically to the mix of traffic in the traffic classes, even if the traffic distribution is uneven across the network. When the traffic load is concentrated, significant performance improvements are achieved for low priority sessions without penalizing high priority sessions.

INTER-CLASS SHARING ARCHITECTURE

For purposes of illustration, the technique of the present invention will be described using a flow-based network model. A flow can be a hard-state virtual circuit such as, for example, an ATM network; a soft-state flow such as, for example, an IP network; or a stateless connection, such as, for example, a TCP connection in today's Internet. However, the present invention may be applied to other flow-based network models and are to be considered within the scope of the present invention.

For purposes of simplification and clarification in this discussion, it is assumed that there are two different types of multi-service class flows in the network: a relative high priority flow (e.g. guaranteed traffic), and a relative low priority flow (e.g. best-effort traffic). Guaranteed flows require bandwidth guarantees. It is to be understood, however, that a greater number of individual service classes may be included within the network without departing from the scope of the present invention. Thus, for example, guaranteed traffic includes the concepts of the Guaranteed Service, Controlled Load Service,.and Differentiated Service classes. The schedulers used by the routers give priority to guaranteed traffic, i.e. best effort sessions use the bandwidth left unused by the guaranteed sessions. Furthermore, it is assumed that each class of service in the network has an associated level of priority relative to the other service classes.

Best-effort flows require no QoS guarantees but would like the network to deliver packets to their destinations as quickly as possible. Thus, one is able to distinguish between high-bandwidth traffic and low latency best-effort traffic. One difference is that high-bandwidth traffic has large data volume and can consume as much bandwidth as is available, while low-latency traffic sends much fewer bytes in each session and consumes only a fraction of available link bandwidth. Since the low-latency sessions use more or less fixed minimum-hop paths and require a small amount of bandwidth, their performance is fairly insensitive to how higher priority sessions are routed, assuming sufficient link capacity is set aside for these sessions.

In describing the technique of the present invention, it is helpful to refer to the flow diagrams of FIGS. 3 and 5–7, which illustrate various procedural steps involved in implementing the technique of the present invention.

Figure 5:
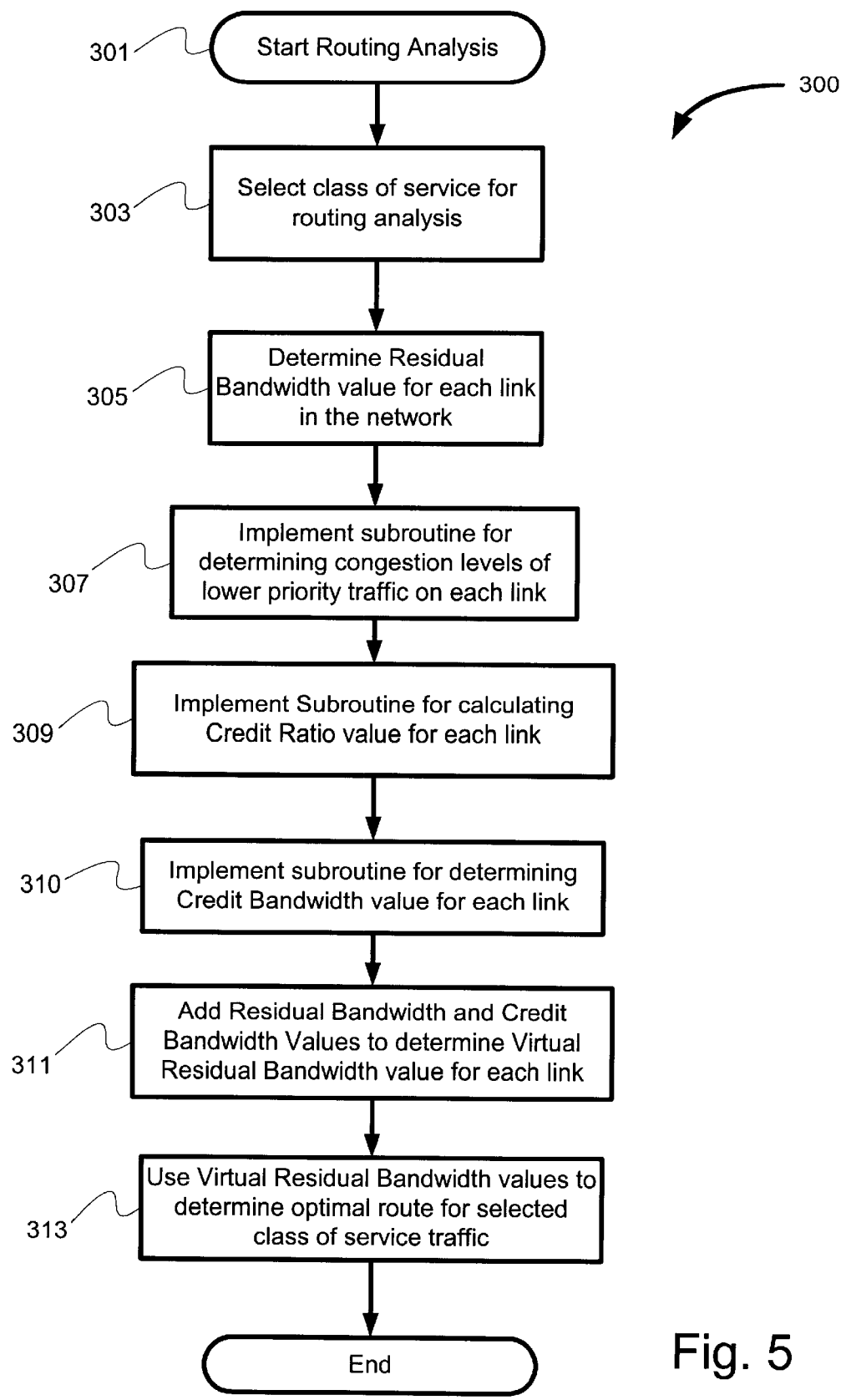
FIGS. 5–7 show flow diagrams illustrating various procedural steps for implementing the technique of the present invention.

To achieve the goal of efficient inter-class resource sharing, an initial step is to select or identify a particular service class for routing analysis, as shown for example in step303 of FIG. 5. Once the selected class of service has been identified, all traffic classes having a lower priority of service than the selected class will be identified as lower priority traffic, and all traffic classes having a higher priority of service than the selected class will be identified as higher priority traffic.

A next step is to identify link congestion in at least a portion of the network. In a specific embodiment, link congestion for each link in the network is determined. One indicator for determining link congestion is the residual bandwidth value associated with each link. As shown in FIG. 5, one step 305 in the present technique includes the step of determining the associated residual bandwidth value for each link in the network or desired network portion.

Additionally, the present technique uses a measure (r) of max-min fair share rate as a barometer of network congestion . In general, it observes a threshold to determine whether a given link is congested. This threshold is dynamically calculated using network state information and permits a finer measure of link congestion than would be possible with a static threshold. In a specific embodiment, the congestion levels of lower priority traffic on each link are determined, as shown, for example in step 307 of FIG. 5. With link-state routing, the max-min fair share rate information for all links of the network are known, and may therefore be determined (405, FIG. 6). From this rate information, it is easy to calculate the minimum and the mean max-min rates, which are represented by MIN and MEAN (406, FIG. 6). The threshold that is used to determine whether a link is congested is a function of MIN and MEAN, as described below.

Once the minimum and mean max-min fair share rates have been determined, it is important to determine in what rate interval a link is congested and in what interval it is not. Contrary to conventional wisdom, the mean max-min fair rate MEAN does not serve as a threshold to distinguish if a link is congested. Congested sessions typically have traffic loads well above average. Accordingly, it is desirable to select a threshold that is lower than, but tracks, the mean. Link rates are therefore divided into the following three intervals: [MIN, LOW_MARK], [LOW_MARK, HIGH_MARK], and (HIGH_MARK, infinity), where:

$$\text{LOW\_MARK} = \text{MIN} + \frac{\text{MEAN} - \text{MIN}}{3}$$

$$\text{HIGH\_MARK} = \text{MIN} - \frac{\text{MEAN} - \text{MIN}}{3}$$

Figure 4:
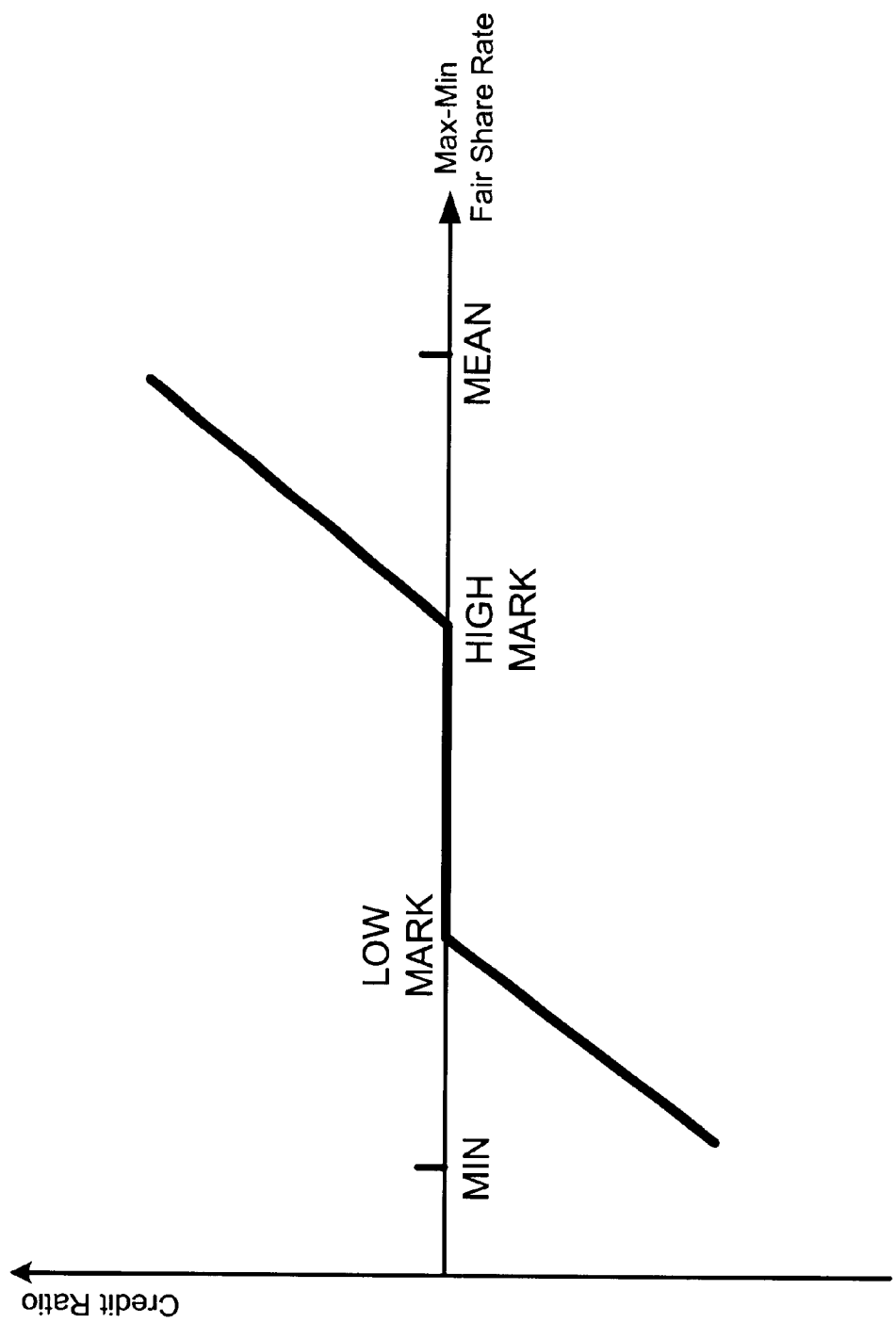
FIG. 4 is a graphical illustration of the relationship between the max-min fair share rate and credit ratio values as defined in the present invention.
Figure 6:
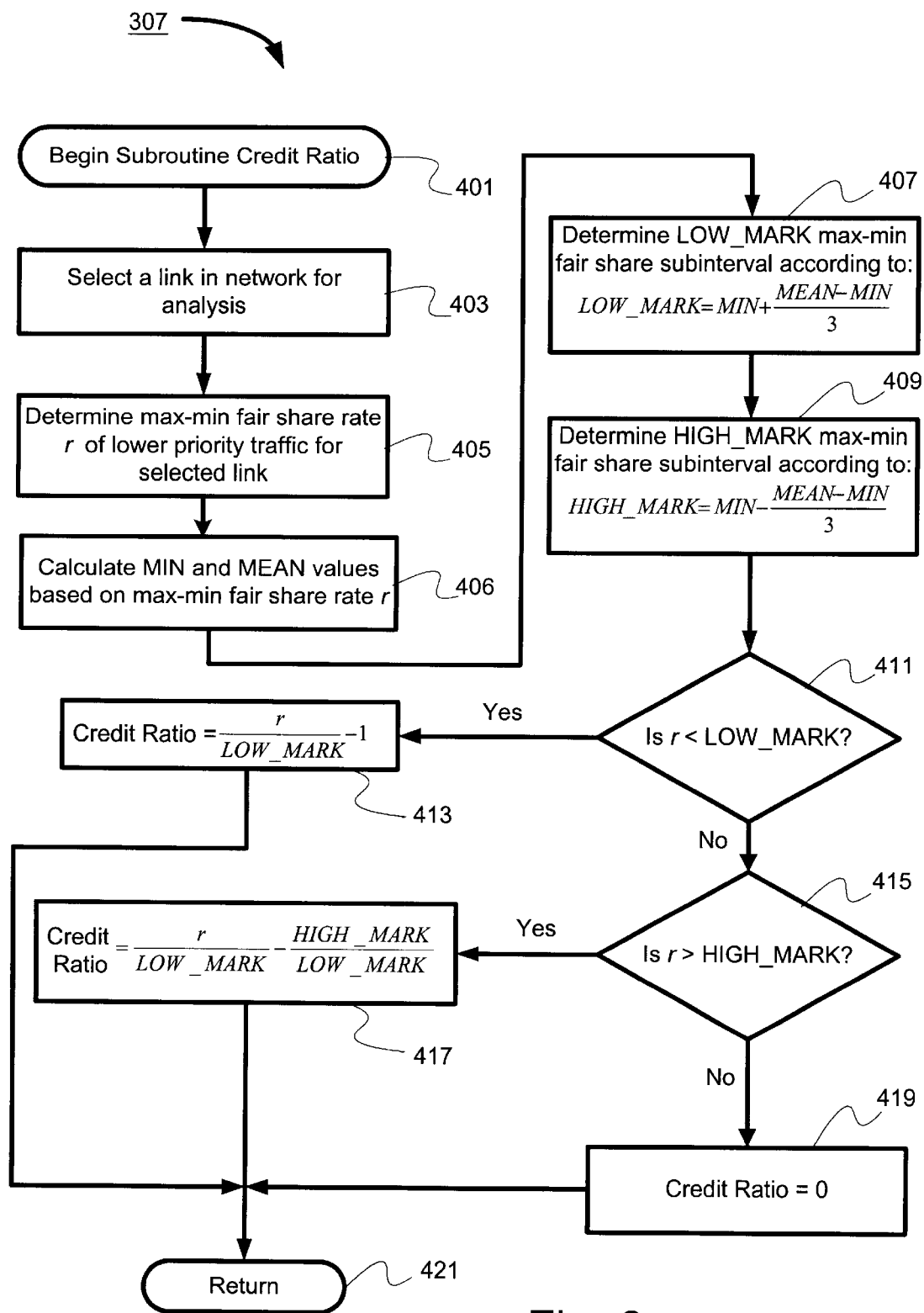
Figure 7:
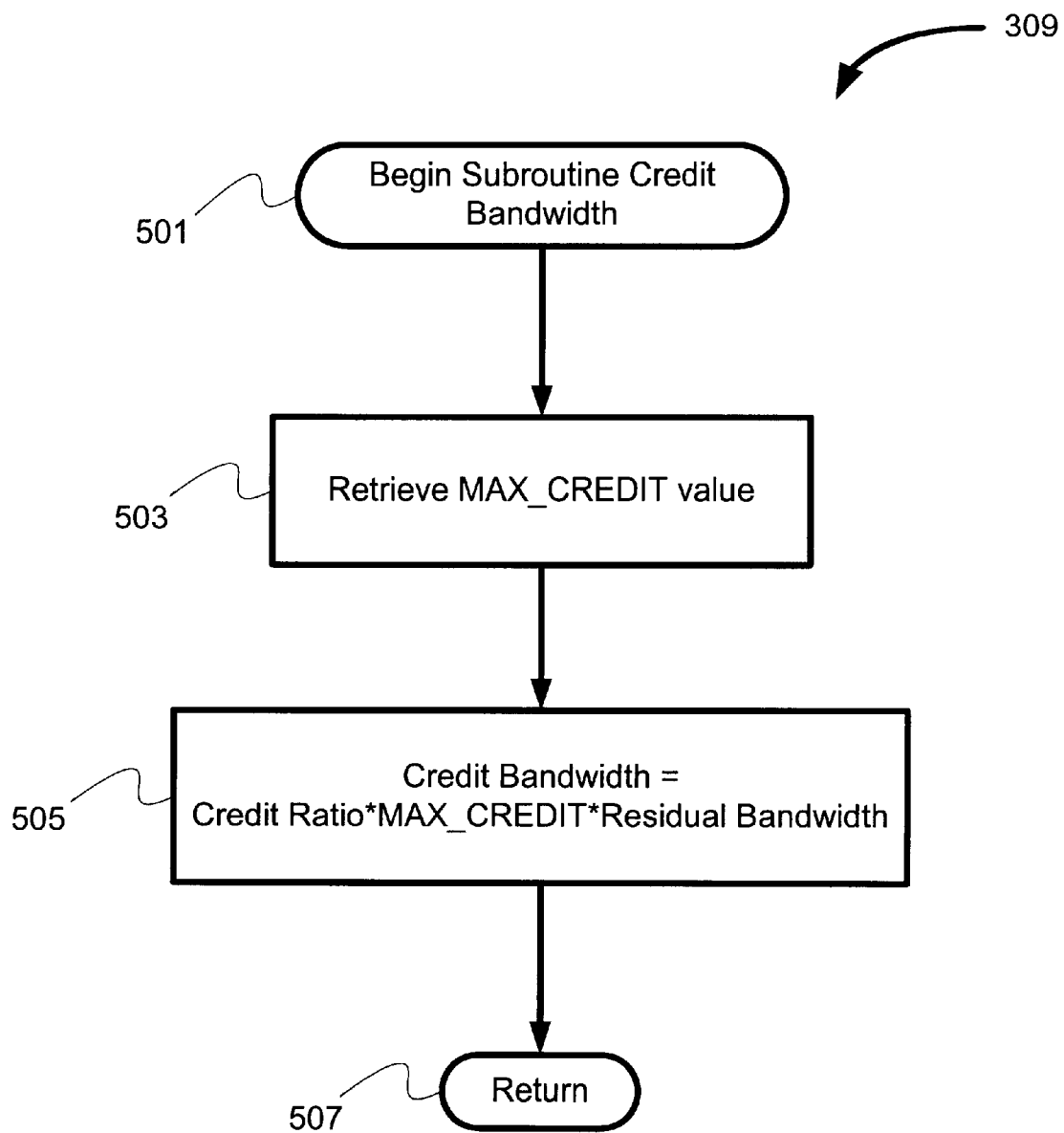

This divides the interval [MIN, MEAN] into three equal subintervals, as shown, for example, in FIG. 4, and described in steps 407 and 409 of FIG. 6. When the max-min fair share rate (r) of a given link is in the lower subinterval [MIN, LOW_MARK], the link is considered congested and, therefore, its use for guaranteed traffic should be discouraged. In other words, guaranteed sessions should avoid using this link if other less congested links are available. If the max-min fair rate of a link is greater than HIGH_MARK, the link is not congested and its use should be encouraged for guaranteed traffic.

VIRTUAL RESIDUAL BANDWIDTH

In order to encourage or to discourage the use of a particular link, a certain amount of "credits" is assigned to the link. The present inventive entity has defined the concept of "virtual residual bandwidth", which is equal to the residual bandwidth value of a selected link, adjusted according to a "credit bandwidth". As illustrated, for example, in step 311, FIG. 5, the Virtual Residual Bandwidth is defined as:

Virtual Residual Bandwidth (*VR*)=Residual Bandwidth+Credit Bandwidth (1)

The amount of credit to be assigned to a link depends on its link congestion condition, which may be referred to for convenience as the link congestion index or Credit Ratio, as defined by the following formulae (and as described in step 309 of FIG. 5):

$$\text{Credit Ratio} = \begin{cases} \dfrac{r}{\text{LOW\_MARK}} - 1 & \text{if } r < \text{LOW\_MARK} \\ 0 & \text{if } \text{LOW\_MARK} \le r \le \text{HIGH\_MARK} \\ \dfrac{r}{\text{LOW\_MARK}} - \dfrac{\text{HIGH\_MARK}}{\text{LOW\_MARK}} & \text{if } r > \text{HIGH\_MARK} \end{cases}$$

Once the Credit Ratio has been determined, the Credit Bandwidth value may be calculated (as shown in step 310, FIG. 5, and in FIG. 6) according to the formula:

Credit Bandwidth=Credit Ratio*MAX_CREDIT*Residual Bandwidth where MAX_CREDIT is the maximal ratio of adjustment to be made when the max-min fair share rate of the link is approaching zero. From the definition, the Credit Ratio is positive when the max-min fair rate r of the link is in the interval [HIGH_MARK,infinity] (415, FIG. 6), and is negative when r is in the interval [MIN, LOW_MARK] (413, FIG. 6).

Other definitions for the credit ratio are of course possible. However, experimental evidence suggests that it is preferable for the credit ratio to meet the following guidelines:

(A) For a link heavily loaded with best-effort traffic, the difference between real residual bandwidth and virtual residual bandwidth should be large enough so that this congested link can be avoided.

(B) The change of the value of virtual link residual bandwidth should be smooth. For this reason, an interval of max-min fair share value is created which yields a Credit Ratio equal to zero.

In accordance with the above guidelines, it is preferable to configure the Credit Ratio function to have a stable interval where no rate adjustment to the residual bandwidth is performed. In a specific embodiment as shown in FIG. 4, for example, this stable interval (i.e. the region where the Credit Ratio is zero) occurs where the max-min fair rate of a link falls in the interval [LOW_MARK,HIGH_MARK], and is also described in step 419 of FIG. 6. Problems may occur when the Credit Ratio function is designed to not include a stable interval, such as, for example, where the link congestion index is divided into only two intervals instead of three. In such a situation, it is possible to experience bandwidth oscillation, particularly in the region where the Credit Ratio value is near zero. Consequently, it becomes very difficult to select a pivot point of link max-min fair share rate to assign 0 credit. Thus, it is preferable to include a stable interval [LOW_MARK, HIGH_MARK], such that no adjustment to the residual bandwidth value is needed if the max-min fair rate of a link is within this interval.

It is to be noted that it is also possible to divide the max-min fair share rate of a link into any number of intervals equal to or greater than two. As discussed above, using only two intervals may be problematic. However, the use of three or more intervals is advantageous since an increased number of intervals allows for a more accurate measurement of link congestion, which, in turn, improves the qualitative value of the Credit Ratio function. However, as the number of intervals increases, the complexity and time needed for calculating virtual residual bandwidth values may also increase.

The inter-class load sharing technique of the present invention may be summarized as follows. A negative credit is added to the residual bandwidth value of a link if the link is heavily loaded with lower priority traffic. Similarly, a positive credit is added to links lightly loaded with lower priority traffic. Lower priority traffic may be defined as any traffic having a respective service class priority lower than the service class for which routing analysis is being determined. In the example where routing analysis is to be carried out for guaranteed traffic, the lower priority traffic would include best effort traffic.

In a multi-class routing environment the use of "virtual residual" bandwidth instead of "real" residual bandwidth provides a more realistic measure of the congestion on a given link. Moreover, this measure of congestion tracks changes in the network load. Thus, there is no need to statically split link capacity between guaranteed sessions and best-effort sessions. Guaranteed sessions avoid using links that are heavily loaded with best-effort traffic.

While dynamic link sharing works well for most scenarios, it can potentially create a number of problems. First, even though it is typically the case that best effort sessions dominate the traffic load, it is still important to consider what happens when the guaranteed traffic load is both high and uneven. Under these conditions, it is possible that the guaranteed sessions reserve all the capacity of certain links, which may result in starvation of the best effort traffic. To avoid this problem, it is suggested that a certain fraction of the capacity of each link (e.g., 5%–10%) is reserved for best-effort traffic.

Another potential problem is that the dynamic link sharing algorithm may force guaranteed sessions to use longer physical paths, which increases resource consumption and can potentially result in higher blocking rates. However, research suggests that, for light loads of guaranteed traffic, the blocking rates for different routing algorithms are all zero or close to zero. Moreover, experimental evidence has shown that, even when the guaranteed traffic load is quiet heavy, there is little increase in the blocking rate for different routing algorithms.

EXAMPLE

By way of the following example, the technique of the present invention may be illustrated. First, for this example, it is assumed that separate routing algorithms will be employed for routing best-effort and guaranteed traffic, respectively. For guaranteed traffic, a commonly used algorithm is the shortest-distance path algorithm based on the link residual bandwidth. The distance of a given path P is determined by the equation:

$$dist(P) = \sum_{i \in P} \frac{1}{Ri} \qquad (2)$$

where $R_i$ is the residual bandwidth of link i.

For best effort traffic, the polynomial based distance function:

$$dist(P) = \sum_{i \in P} \frac{1}{r_i} \quad (3)$$

where $r_i$ the max-min fair share rate for a new connection on link i, has been shown to be the most effective.

Figure 3:
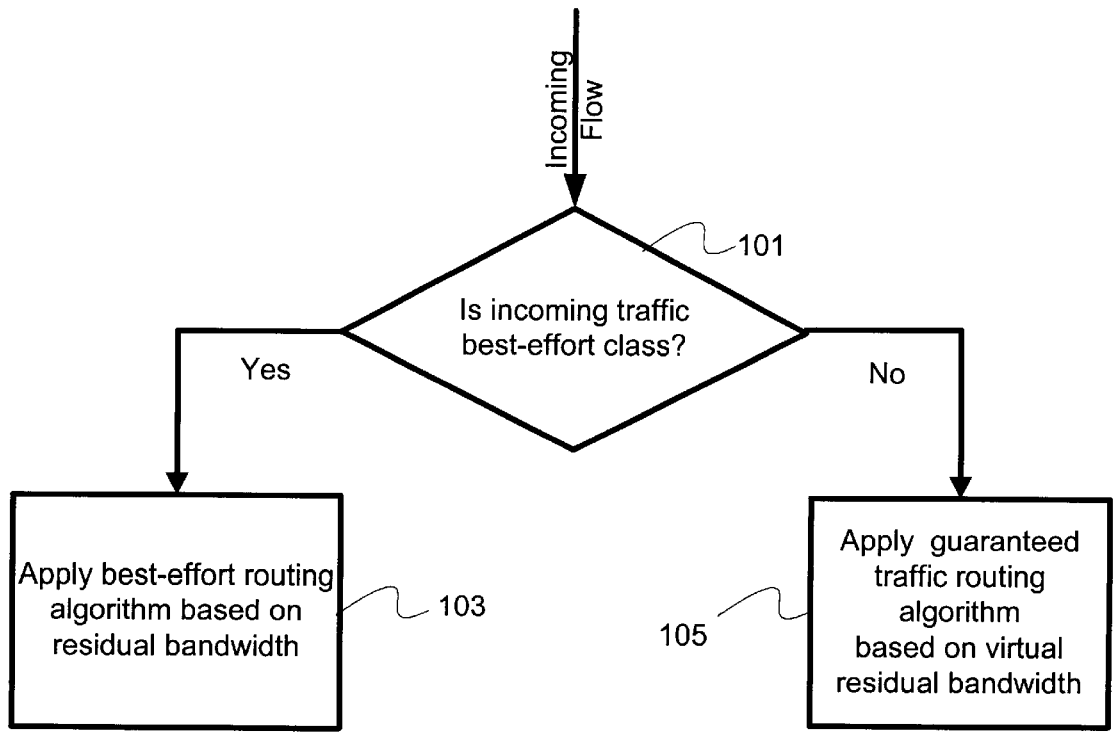
FIG. 3 shows a flow diagram illustrating a portion of the technique of the present invention.

Given the above two algorithms for the individual service classes, the multi-class routing technique of the present invention may be applied using the procedure as shown, for example, in FIG. 3. First, the particular service class of traffic to be routed is determined. For a best-effort session, the best-effort routing algorithm based on residual bandwidth is employed (103, FIG. 3). In the above example, the shortest-path routing algorithm would be employed, using the distance function of Equation (3) as the cost. For a guaranteed session, the guaranteed traffic routing algorithm based on virtual residual bandwidth is employed (105, FIG. 3). In the above example, the shortest-path algorithm would be employed using the distance function of Equation (2) as the cost, but the residual bandwidth rate ($R_i$) would be replaced with the virtual residual bandwidth rate $VR_i$, as defined in Equation (1) above (313, FIG. 5).

Hence, in the above example, the multi-class routing technique of the present invention is independent of, and is implemented without changes to, routing algorithms employed for individual service classes. The only change is the use of the virtual residual bandwidth instead of the real residual bandwidth when routing guaranteed sessions. It is to be noted that the impact on throughput of the multi-class routing algorithm can of course be different when different algorithms are used for individual service classes.

Using the technique of the present invention, the distribution of network resources across traffic classes adapts dynamically and automatically to the mix of traffic in the traffic classes, even if the traffic distribution is uneven across the network. Thus, link resources are dynamically partitioned between guaranteed traffic and best-effort traffic. Moreover, extensive simulation study shows the effectiveness of the present technique. When the traffic load is concentrated, significant performance improvements are achieved for low priority sessions without penalizing high priority sessions. These results demonstrate that QoS routing for guaranteed traffic is desirable even if when the load of guaranteed traffic is light and call blocking is not an issue.

Although several specific embodiment s of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

It is claimed:

1. A method for routing traffic in an integrated services network which supports a plurality of different service classes, the network including a plurality of nodes interconnected by links, the method comprising:

(a) selecting a particular service class of traffic for routing analysis, whereby service classes having respective priorities lower than that of said particular service class are referred to as lower priority, and service classes having respective priorities higher than that of said particular service class are referred to as higher priority;

(b) calculating link congestion of at least a portion of said network, wherein a respective residual bandwidth value and a respective link congestion index is calculated for each link within said network portion, said link congestion index comprising a plurality of different subintervals including a relatively low congestion subinterval, and a relatively high congestion subinterval;

(c) dynamically adjusting the calculated residual bandwidth value for each respective link within said network portion such that:
        if the congestion index for a selected link indicates a relatively high congestion level of lower priority traffic, the residual bandwidth value for said selected link is decreased, and
        if the congestion index for a selected link indicates a relatively low congestion level of lower priority traffic, the residual bandwidth value for said selected link is increased; and (d) determining an optimal path for routing traffic associated with said selected class of service using said dynamically adjusted residual bandwidth values.

2. The method of claim 1 wherein said link congestion index further includes a mid subinterval between said low subinterval and said high subinterval, said mid subinterval indicating a relatively average level of congestion, and wherein said residual bandwidth adjustment step (c) includes the step of not adjusting the calculated residual bandwidth value for a selected link within said network portion if the related congestion index of said selected link indicates an average congestion level of lower priority traffic.

3. The method of claim 2 wherein said plurality of different service classes includes a best-effort service class and a guaranteed service class.

4. The method of claim 2 wherein said dynamic adjusting step (c) includes:
    adding a negative credit bandwidth value to the residual bandwidth value of said selected link if the congestion index for said selected link indicates a relatively high congestion level of lower priority traffic; and
    adding a positive credit bandwidth value to the residual bandwidth value of said selected link if the congestion index for said selected link indicates a relatively low congestion level of lower priority traffic.

5. The method of claim 4 further including the step of adding a credit bandwidth value of zero to the residual bandwidth value of said selected link if the congestion index for said selected link indicates a relatively average congestion level of lower priority traffic.

6. The method of claim 1 wherein the dynamically adjusted residual bandwidth value for a selected link corresponds to a virtual residual bandwidth value for said selected link.

7. In an integrated services network which supports a plurality of different service classes, the network including a plurality of nodes interconnected by links, a method for routing traffic associated with a selected class of service, whereby service classes having respective priorities lower than that of said selected service class are referred to as lower priority, and service classes having respective priorities higher than that of said selected service class are referred to as higher priority, said method comprising:

(a) calculating, based on said selected class of service, a respective value of available bandwidth for each link within at least a portion of said network, wherein the calculation of available bandwidth for a selected link is based upon congestion of lower priority traffic on said selected link, said calculated value of available bandwidth being referred to as a virtual residual bandwidth value; and (b) routing traffic associated with said selected class of service, utilizing said virtual residual bandwidth values, to a final destination, along at least one path, in a manner so as to discourage use of links having relatively high congestion levels of lower priority traffic, even if the at least one path traverses more links than a number of links traversed by a minimum hop path to the final destination.

8. The method of claim 7 further including calculating a respective link congestion index for each link within said network portion, said link congestion index comprising a plurality of different subintervals including a relatively low congestion subinterval, and a relatively high congestion subinterval.

9. The method of claim 8, said method further including:
discouraging use of links having relatively high congestion levels of lower priority traffic; and
encouraging use of links having relatively low congestion levels of lower priority traffic.

10. The method of claim 9,
wherein said discouraging step includes the step of increasing respective link cost values associated with said links having relatively high congestion levels of lower priority traffic; and
wherein said encouraging step includes the step of decreasing respective link cost values associated with said links having relatively high congestion levels of lower priority traffic.

11. The method of claim 9 wherein said congestion index includes a mid subinterval between said low subinterval and said high subinterval, said mid subinterval indicating a relatively average level of congestion, said method including the step of not adjusting respective link costs values associated with links having relatively average levels of congestion of lower priority traffic.

12. The method of claim 10 wherein the respective link cost value for a selected link is the virtual residual bandwidth value for said selected link.

13. The method of claim 10 wherein said plurality of different service classes includes a best-effort service class and a guaranteed service class.

14. The method of claim 7 wherein said virtual bandwidth calculating step includes:
calculating a respective residual bandwidth value and a respective link congestion index for each link within said network portion, said link congestion index comprising a plurality of different subintervals including a relatively low congestion subinterval, and a relatively high congestion subinterval; and
utilizing the calculated residual bandwidth value and congestion index for a selected link to determine the virtual residual bandwidth value for said selected link.

15. The method of claim 14 wherein said virtual bandwidth calculating step includes:
calculating a credit bandwidth value for each respective link in said network portion, wherein:
the credit bandwidth for a selected link is assigned a value less than zero if the congestion index for said selected link indicates a relatively high congestion level of lower priority traffic; and
the credit bandwidth for said selected link is assigned a value greater than zero if the congestion index for said selected link indicates a relatively high congestion level of lower priority traffic; and
summing the residual bandwidth value and credit bandwidth value of said selected link to determine the virtual residual bandwidth value of said selected link.

16. The method of claim 15 wherein said congestion index includes a mid subinterval between said low subinterval and said high subinterval, said mid subinterval indicating a relatively average level of congestion, wherein said virtual bandwidth calculating step further includes the step of assigning a credit bandwidth value of zero to links having a relatively average level of congestion of lower priority traffic.

17. A computer program product for routing traffic associated with a selected class of service in an integrated services network which supports a plurality of different service classes, whereby service classes having respective priorities lower than that of said selected service class are referred to as lower priority, and service classes having respective priorities higher than that of said selected service class are referred to as higher priority, the network including a plurality of nodes interconnected by links, the computer program product comprising:
at least one computer usable medium having computer readable code embodied therein, the computer readable code comprising:
computer code for calculating, based on said selected class of service, a value of available bandwidth for each link within at least a portion of said network, wherein the calculation of available bandwidth for a selected link is based upon congestion of lower priority traffic on said selected link, said calculated value of available bandwidth being referred to as a virtual residual bandwidth value; and
computer code for routing traffic associated with said selected class of service, utilizing said virtual residual bandwidth values, to a final destination, along at least one path, in a manner so as to discourage use of links having relatively high congestion levels of lower priority traffic, even if the at least one path traverses more links than a number of links traversed by a minimum hop path to the final destination.

18. The computer program product of claim 17 further including:
computer code for calculating a respective residual bandwidth value and a respective link congestion index for each link within said network portion, said link congestion index comprising a plurality of different subintervals including a relatively low congestion subinterval, and a relatively high congestion subinterval; and
computer code for utilizing the calculated residual bandwidth value and congestion index for a selected link to determine the virtual residual bandwidth value for said selected link.

19. The computer program product of claim 18 further including:
computer code for calculating a credit bandwidth value for each respective link in said network portion, wherein:
the credit bandwidth for a selected link is assigned a value less than zero if the congestion index for said selected link indicates a relatively high congestion level of lower priority traffic; and
the credit bandwidth for said selected link is assigned a value greater than zero if the congestion index for said selected link indicates a relatively high congestion level of lower priority traffic; and
computer code for summing the residual bandwidth value and credit bandwidth value of said selected link to determine the virtual residual bandwidth value of said selected link.

20. The computer program product of claim 19, wherein said congestion index further includes a mid subinterval between said low subinterval and said high subinterval, said mid subinterval indicating a relatively average level of congestion, said computer program product further including computer code for assigning a credit bandwidth value of zero to links having a relatively average level of congestion of lower priority traffic.

21. The computer program product of claim 19 wherein the computer readable medium is a data signal embodied in a carrier wave.

22. A router for routing traffic in an integrated services network which supports a plurality of different service classes, the network including a plurality of nodes interconnected by links, the router comprising:
   means for selecting a particular service class of traffic for routing analysis, whereby service classes having respective priorities lower than that of said particular service class are referred to as lower priority, and service classes having respective priorities higher than that of said particular service class are referred to as higher priority;
   means for calculating link congestion of at least a portion of said network, wherein a respective residual bandwidth value and a respective link congestion index is calculated for each link within said network portion, said link congestion index comprising a plurality of different subintervals including a relatively low congestion subinterval, and a relatively high congestion subinterval;
   means for dynamically adjusting the calculated residual bandwidth value for each respective link within said network portion such that:
      if the congestion index for a selected link indicates a relatively high congestion level of lower priority traffic, the residual bandwidth value for said selected link is decreased, and
      if the congestion index for a selected link indicates a relatively low congestion level of lower priority traffic, the residual bandwidth value for said selected link is increased; and
   means for determining an optimal path for routing traffic associated with said selected class of service using said dynamically adjusted residual bandwidth values.

23. The router of claim 22 wherein said link congestion index further includes a mid subinterval between said low subinterval and said high subinterval, said mid subinterval indicating a relatively average level of congestion, and wherein said residual bandwidth adjustment means includes means for not adjusting the calculated residual bandwidth value for a selected link within said network portion if the related congestion index of said selected link indicates an average congestion level of lower priority traffic.

24. The router of claim 23 wherein said plurality of different service classes includes a best-effort service class and a guaranteed service class.

25. The router of claim 23 wherein said dynamic adjusting means includes:
   means for adding a negative credit bandwidth value to the residual bandwidth value of said selected link if the congestion index for said selected link indicates a relatively high congestion level of lower priority traffic;
   means for adding a positive credit bandwidth value to the residual bandwidth value of said selected link if the congestion index for said selected link indicates a relatively low congestion level of lower priority traffic; and
   means for adding a credit bandwidth value of zero to the residual bandwidth value of said selected link if the congestion index for said selected link indicates a relatively average congestion level of lower priority traffic.

26. The router of claim 23 wherein the dynamically adjusted residual bandwidth value for a selected link corresponds to a virtual residual bandwidth value for said selected link.

27. A method for routing traffic of a first priority class in a network, the network comprising a plurality of links, each link having a residual bandwidth value associated therewith, the method comprising:
   (a) determining, on selected links, congestion levels of traffic associated with at least one class of priority which is lower than that of said first priority class; and
   (b) routing traffic associated with said first priority class to a final destination, along at least one path, in a manner so as to discourage use of links having relatively high congestion levels of lower priority traffic, even if the at least one path traverses more links than a number of links traversed by a minimum hop path to the final destination.

28. A router for routing traffic of a first class in a network, the network comprising a plurality of links, each link having a residual bandwidth value associated therewith corresponding to the first class, the router comprising:
   a network interface for connecting to the network;
   a central processing unit; and
   memory;
   wherein the router is configured or designed to determine, on selected links, congestion levels of traffic associated with at least one class of priority which is lower than that of said first priority class; and
   wherein the router is further configured or designed to route traffic associated with said first priority class in a manner so as to favor traversal links having relatively low congestion levels of lower priority traffic over links along a minimum hop path having relatively high congestion levels of lower priority traffic.

29. The method of claim 27 further comprising routing traffic associated with said first priority class in a manner so as to encourage use of links having relatively low congestion levels of lower priority traffic.

30. The method of claim 27 further comprising routing traffic associated with said first priority class in a manner so as to discourage preemption of bandwidth on said selected links which is being used by traffic associated with a lower class of priority than said first priority class.

31. The system of claim 28 wherein the router is further configured or designed to route traffic associated with said first priority class in a manner so as to encourage use of links having relatively low congestion levels of lower priority traffic.

32. The system of claim 28 wherein the router is further configured or designed to route traffic associated with said first priority class in a manner so as to discourage preemption of bandwidth on said selected links which is being used by traffic associated with a lower class of priority than said first priority class.

* * * * *